(12) United States Patent
Sakai et al.

(10) Patent No.: US 9,482,690 B2
(45) Date of Patent: Nov. 1, 2016

(54) SCANNING PROBE MICROSCOPE

(71) Applicant: OLYMPUS CORPORATION, Shibuya-ku, Tokyo (JP)

(72) Inventors: Nobuaki Sakai, Hachioji (JP); Yoshitsugu Uekusa, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/603,260

(22) Filed: Jan. 22, 2015

(65) Prior Publication Data

US 2015/0135374 A1    May 14, 2015

Related U.S. Application Data

(63) Continuation of application No. PCT/JP2013/069199, filed on Jul. 12, 2013.

(30) Foreign Application Priority Data

Jul. 23, 2012   (JP) .................. 2012-162823

(51) Int. Cl.
| | |
|---|---|
| *G01Q 20/02* | (2010.01) |
| *G01Q 10/00* | (2010.01) |
| *G01Q 30/14* | (2010.01) |
| *G01Q 30/02* | (2010.01) |

(52) U.S. Cl.
CPC .............. *G01Q 10/00* (2013.01); *G01Q 30/14* (2013.01); *G01Q 20/02* (2013.01); *G01Q 30/025* (2013.01)

(58) Field of Classification Search
USPC ................ 850/1, 2, 3, 4, 5, 6, 7, 12, 14, 15
See application file for complete search history.

(56) References Cited

U.S. PATENT DOCUMENTS

| | | | |
|---|---|---|---|
| 6,051,825 A | 4/2000 | Lindsay et al. | |
| 8,087,288 B1 | 1/2012 | Prater et al. | |
| 2002/0092340 A1* | 7/2002 | Prater et al. ................. | 73/24.02 |
| 2004/0129063 A1 | 7/2004 | Balooch et al. | |
| 2005/0199047 A1* | 9/2005 | Adams ................... | G01Q 60/42 73/105 |
| 2011/0048115 A1* | 3/2011 | Ota et al. ..................... | 73/64.56 |
| 2012/0278958 A1* | 11/2012 | Yu et al. ........................ | 850/33 |

FOREIGN PATENT DOCUMENTS

| | | |
|---|---|---|
| JP | 09054098 A | 2/1997 |
| JP | 2011053018 A | 3/2011 |
| JP | 2011252849 A | 12/2011 |

OTHER PUBLICATIONS

International Search Report (ISR) dated Aug. 13, 2013 issued in International Application No. PCT/JP2013/069199.

(Continued)

*Primary Examiner* — Nicole Ippolito
(74) *Attorney, Agent, or Firm* — Holtz, Holtz & Volek, PC

(57) ABSTRACT

A scanning probe microscope to measure a sample set on a sample mount in liquid includes a scanning mechanism to scan a cantilever provided with a probe at a free end along an X-axis, a Y-axis, and a Z-axis perpendicular to each other, and a liquid contact member including an optical transmission portion to transmit detection light for detecting a displacement of the cantilever, and arranged at least partially in contact with the liquid. The liquid contact member is not scanned by the scanning mechanism.

10 Claims, 15 Drawing Sheets

(56) References Cited

OTHER PUBLICATIONS

International Preliminary Report on Patentability (IPRP) including Written Opinion dated Feb. 5, 2015, issued in parent International Application No. PCT/JP2013/069199.

Japanese Office Action (and English translation thereof) dated Nov. 17, 2015, issued in counterpart Japanese Application No. 2014-526859.

Extended European Search Report dated Mar. 1, 2016, issued in counterpart European Application No. 13822796.2.

* cited by examiner

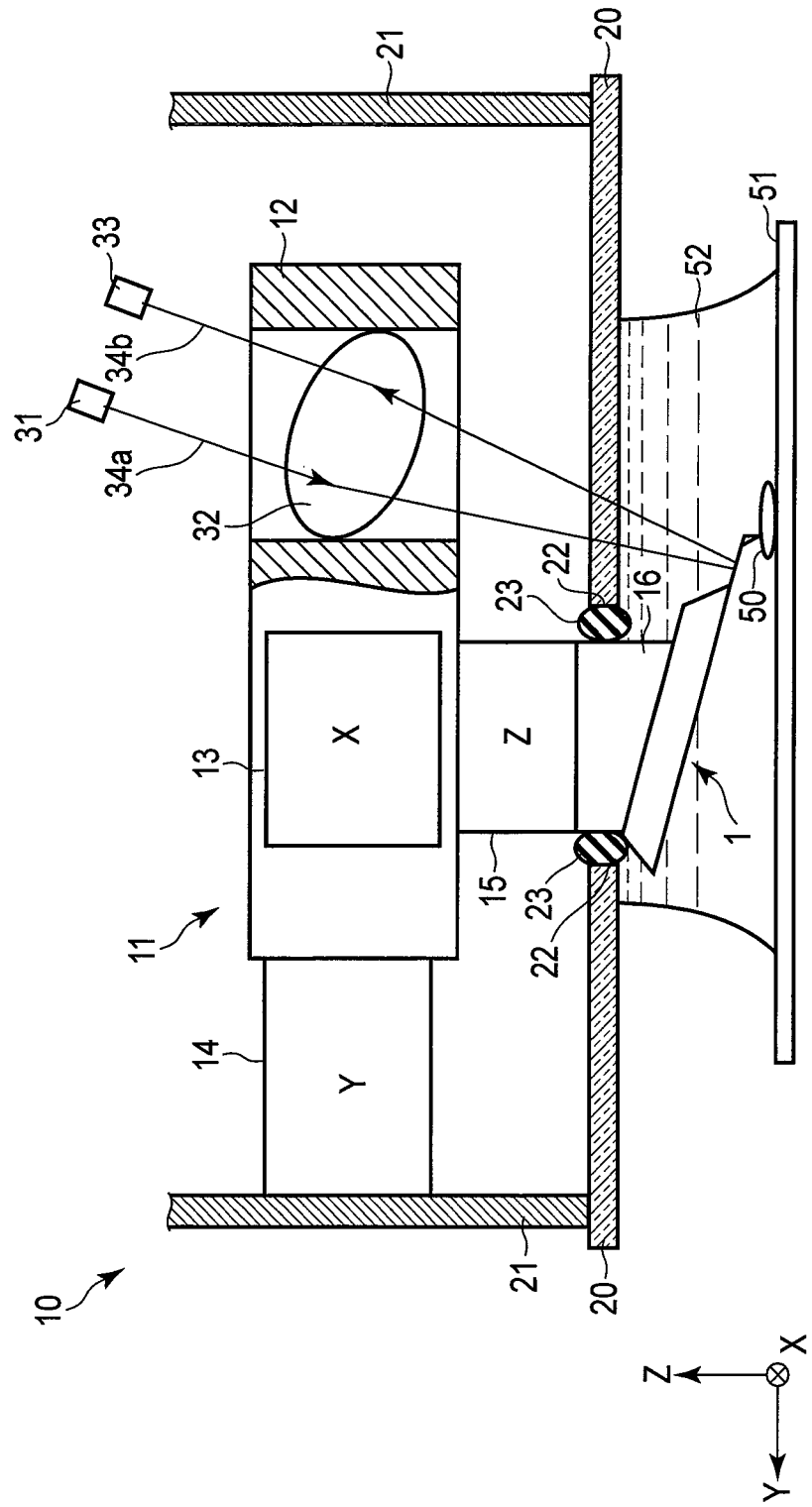

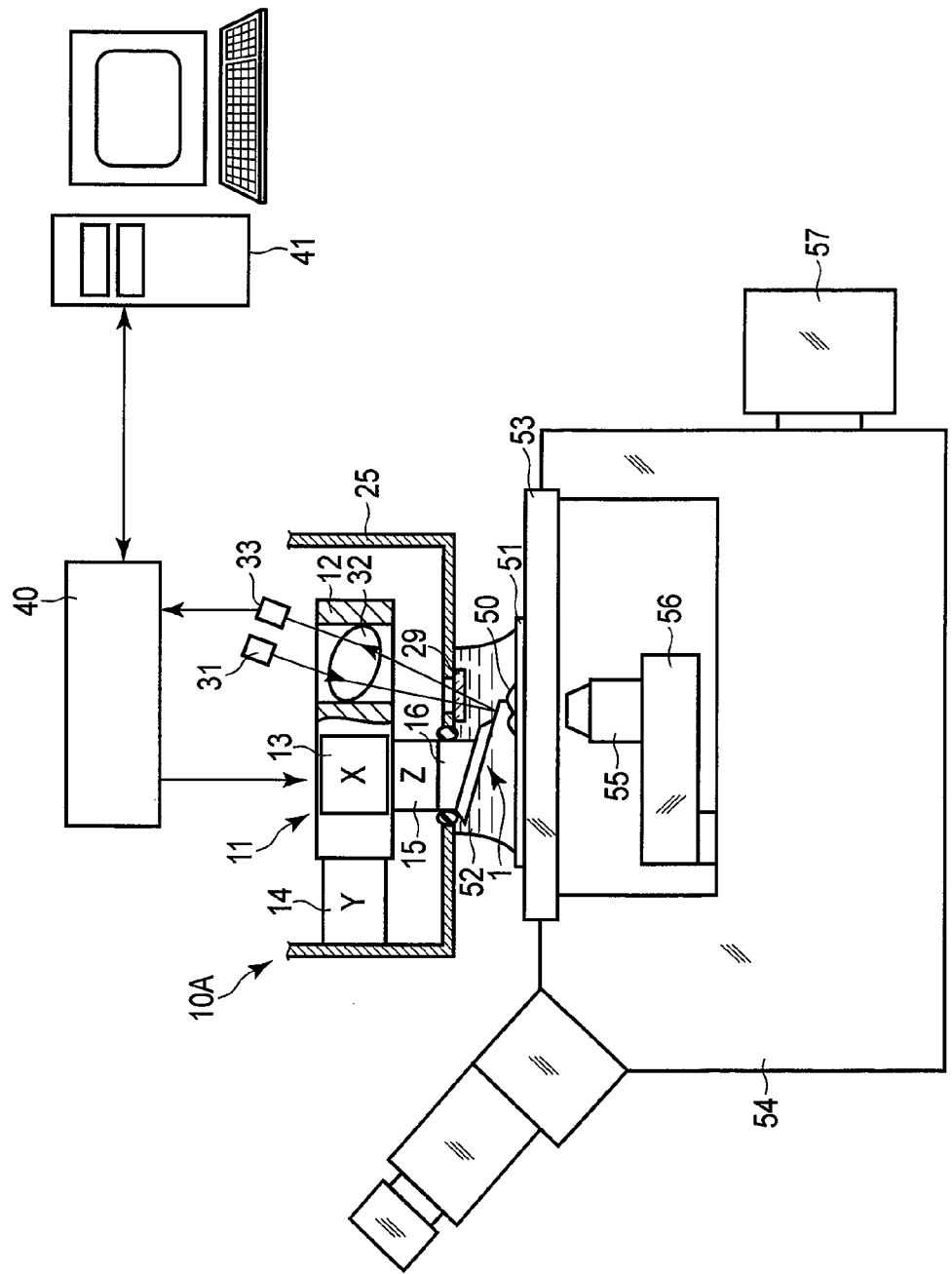
F I G. 8

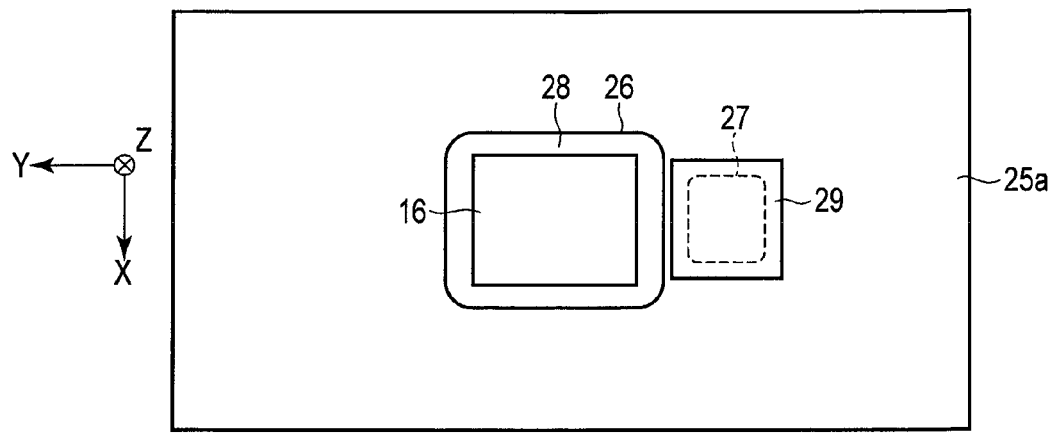
F I G. 10A
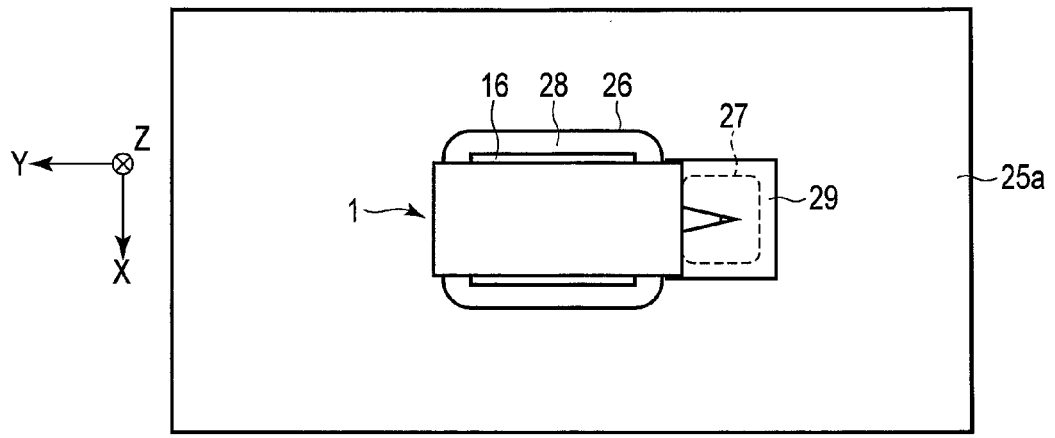
F I G. 10B

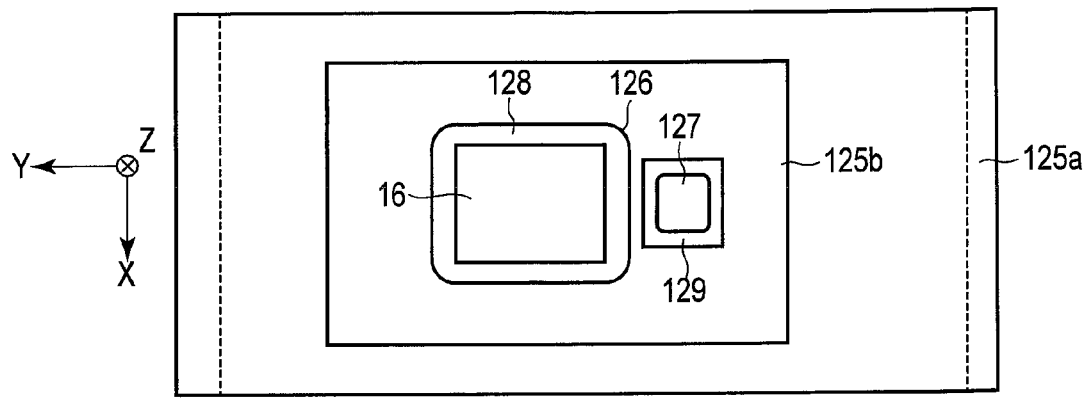
F I G. 16A
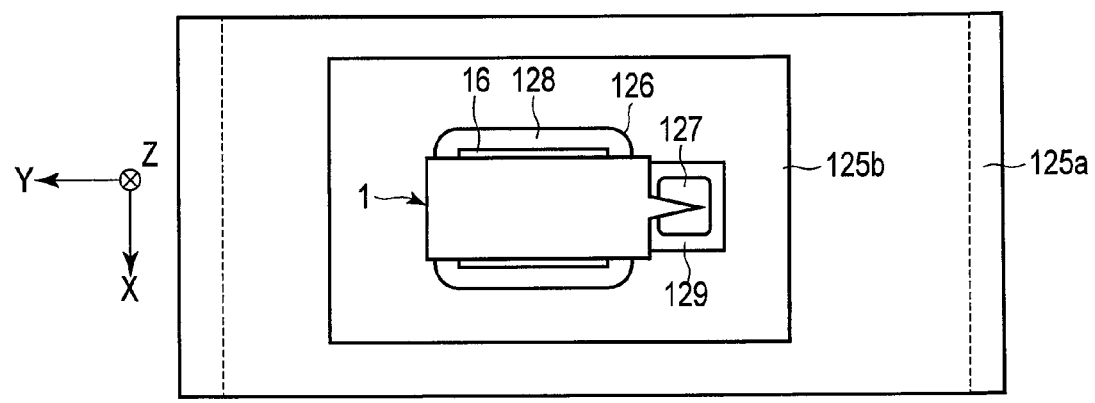
F I G. 16B

SCANNING PROBE MICROSCOPE

CROSS-REFERENCE TO RELATED APPLICATIONS

This application is a Continuation Application of PCT Application No. PCT/JP2013/069199, filed Jul. 12, 2013 and based upon and claiming the benefit of priority from prior Japanese Patent Application No. 2012-162823, filed Jul. 23, 2012, the entire contents of all of which are incorporated herein by reference.

BACKGROUND OF THE INVENTION

1. Field of the Invention

The present invention relates to a scanning mechanism of a scanning probe microscope.

2. Description of the Related Art

A scanning probe microscope (SPM) is a scanning microscope that mechanically scans a mechanical probe by a scanning mechanism to obtain information of a sample surface. The scanning probe microscope is a generic term for a scanning tunneling microscope (STM), an atomic force microscope (AFM), a scanning magnetic force microscope (MFM), a scanning near field optical microscope (SNOM), and the like. The scanning probe microscope raster-scans the mechanical probe and a sample relatively in the X and Y directions to obtain surface information of a desired sample region through the mechanical probe, and map and display it on a monitor TV.

Above all, the AFM is a most popular apparatus, and includes, as main machine mechanisms, a cantilever having a mechanical probe at its free end, an optical displacement sensor to detect the displacement of the cantilever, and a scanning mechanism to relatively scan the mechanical probe and a sample. As the optical displacement sensor, an optical lever type optical displacement sensor is employed most widely because of its simple arrangement and high displacement detection sensitivity. The optical lever type optical displacement sensor applies a beam having a diameter of several μm to several ten μm to a cantilever. A change in the reflection direction of the reflected beam depending on the warp of the lever is detected by a two-segments detector or the like. The operation of the mechanical probe at the free end of the cantilever is detected and output as an electrical signal. While the scanning mechanism is controlled in the Z axis direction to keep this output constant, the scanning mechanism is similarly scanned in the X and Y axes directions to map and display the uneven state of a sample surface on the monitor of a computer.

When observing a biological sample in liquid, the AFM is generally combined with an inverted optical microscope. This is because the inverted optical microscope observation is effective not only when obtaining the finding of a sample, but also when positioning the cantilever at a specific portion of the sample. For such a purpose, a lever scan type AFM to scan the cantilever in the X, Y, and Z axes directions is often used so as to cope with various biological samples and sample substrates.

A related art of a lever scan type AFM that is used in liquid is disclosed in U.S. Pat. No. 8,087,288.

BRIEF SUMMARY OF THE INVENTION

The present invention is directed to a scanning probe microscope to measure a sample set on a sample mount in liquid, the scanning probe microscope comprising a scanning mechanism to scan a cantilever provided with a probe at a free end along an X-axis, a Y-axis, and a Z-axis perpendicular to each other, and a liquid contact member including an optical transmission portion to transmit detection light for detecting a displacement of the cantilever, and arranged at least partially in contact with the liquid. The liquid contact member is not scanned by the scanning mechanism.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an enlarged view showing a probe microscope head shown in FIG. 1.

FIG. 8 shows a scanning probe microscope according to a second embodiment.

FIG. 10A is a view showing the probe microscope head in FIG. 8 in a state in which a cantilever chip is removed from a holder, when viewed from a liquid cell.

FIG. 10B is a view showing the probe microscope head in FIG. 8 in a state in which the cantilever chip is fixed to the holder, when viewed from the liquid cell.

FIG. 16A is a view showing the probe microscope head in FIG. 14 in a state in which a cantilever chip is removed from a holder, when viewed from a liquid cell.

FIG. 16B is a view showing the probe microscope head in FIG. 14 in a state in which the cantilever chip is fixed to the holder, when viewed from the liquid cell.

DETAILED DESCRIPTION OF THE INVENTION

Embodiments will now be described with reference to the accompanying drawings.

First Embodiment

Figure 1:
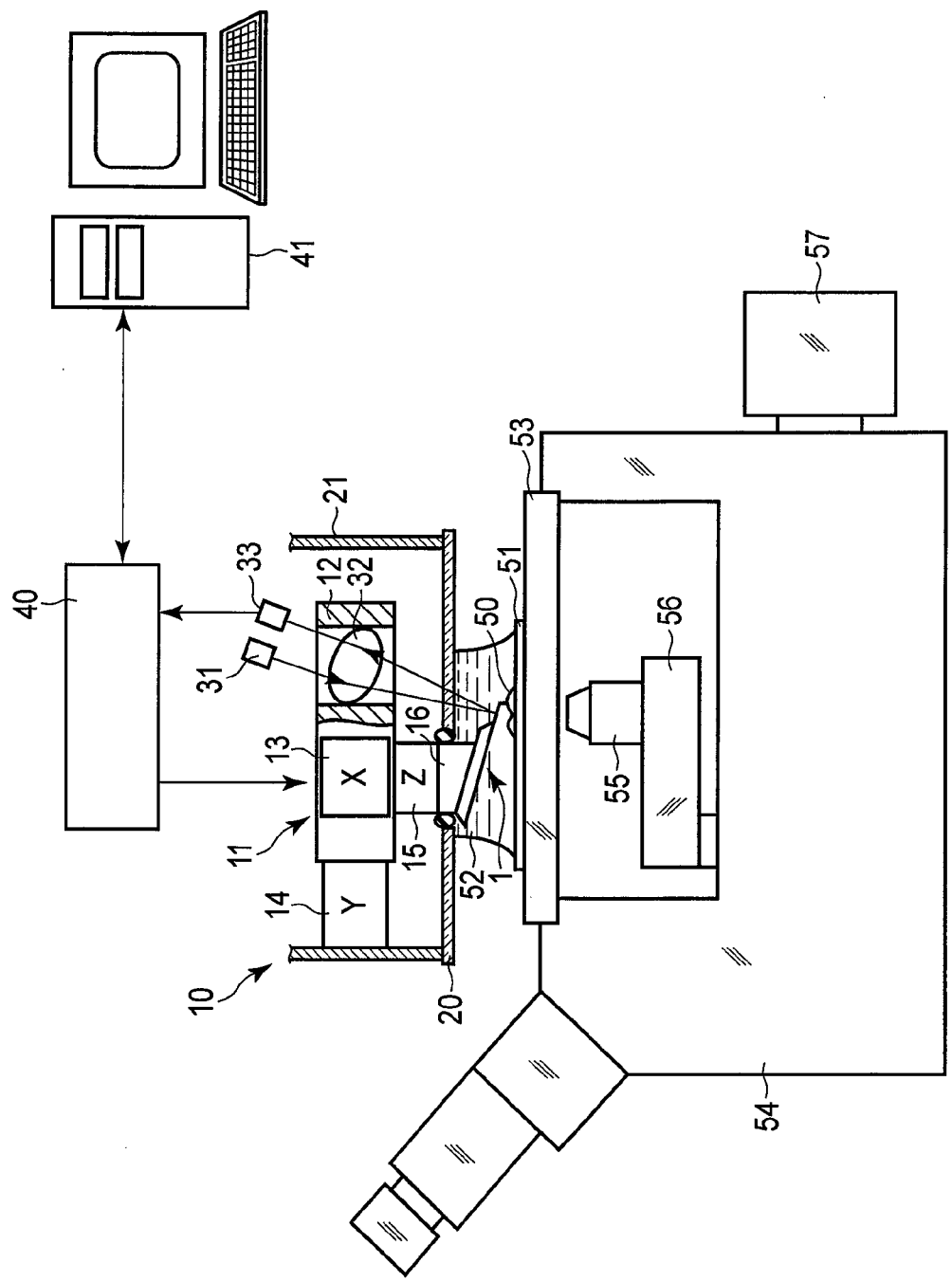
FIG. 1 shows a scanning probe microscope according to a first embodiment.

A scanning probe microscope according to this embodiment is mounted in an inverted optical microscope serving as an optical microscope, as shown in FIG. 1.

The inverted optical microscope includes a microscope housing 54, a microscope stage 53, an objective lens 55, a revolver 56, and an epi-illumination light source 57. A sample mount 51 such as a slide glass is set on the microscope stage 53, and a sample 50 is held on the sample mount 51. The inverted optical microscope is mainly used for in-liquid optical observation of the sample 50.

The scanning probe microscope according to this embodiment is to measure the sample 50 set on the sample mount 51 in liquid. The scanning probe microscope includes a probe microscope head 10, a controller 40 to control the probe microscope head 10, and a computer 41 to process information obtained by the probe microscope head 10. The probe microscope head 10 is supported above the microscope stage 53 by a column (not shown).

As shown in FIG. 2, the probe microscope head 10 includes a scanning mechanism 11 to scan a cantilever chip 1 along the X-, Y-, and Z-axes perpendicular to each other, a support member 21 supporting the scanning mechanism 11, and an optical transmission plate 20 supported by the support member 21.

The scanning mechanism 11 includes a holder 16 to hold the cantilever chip 1, a Z actuator 15 to move the holder 16 along the Z-axis, an X-Y movable portion 12 holding the Z actuator 15, an X actuator 13 to move the X-Y movable portion 12 along the X-axis, and a Y actuator 14 to move the X-Y movable portion 12 along the Y-axis. The X actuator 13 and the Y actuator 14 constitute an X-Y scanner to rasterscan the cantilever chip 1 along the X- and Y-axes. The X actuator 13, the Y actuator 14, and the Z actuator 15 are constituted by, e.g., multilayer piezoelectric elements.

The support member 21 has, e.g., a frame shape. The scanning mechanism 11 is arranged inside the support member 21, and both the X actuator 13 and the Y actuator 14 are fixed to the support member 21.

The optical transmission plate 20 is fixed to the lower end of the support member 21, and closes the opening of the frame-shaped support member 21 at the lower end. The optical transmission plate 20 is an optically transparent plate and is made of, e.g., glass or resin. The support member 21 and the optical transmission plate 20 constitute a housing to contain the scanning mechanism 11. The support member 21 and the optical transmission plate 20 are fixed by adhesion or screwing.

The optical transmission plate 20 is a liquid contact member including an optical transmission portion. The optical transmission plate 20 is arranged in contact with liquid on the sample mount 51, so as to cooperate with the sample mount 51 to sandwich the liquid, forming a liquid cell 52 for measuring the sample 50 in an in-liquid environment. That is, the optical transmission plate 20 includes a cell forming portion to form the liquid cell 52 together with the sample mount 51.

The optical transmission plate 20 has a through hole 22, and the holder 16 extends through the through hole 22. The gap between the holder 16 and the through hole 22 is sealed in a waterproof fashion by an elastic member 23. Part of the holder 16 and the cantilever chip 1 project into the liquid cell 52 through the through hole 22. The elastic member 23 is made of a soft adhesive suitable for waterproofing, such as silicone rubber. Although part of the holder 16 projects into the liquid cell 52 in FIG. 2, the entire holder 16 may project into the liquid cell 52.

In this specification, the liquid cell 52 is a spatial region (environmental region) filled with liquid in order to measure a sample in the liquid. Formation of the liquid cell 52 is to decide the shape of the region of the liquid cell 52. In this embodiment, the shape of the region of the liquid cell 52 is determined by the interface (contact surface) between the liquid and the optical transmission plate 20 (including part of the holder 16 and the cantilever chip 1), the interface (contact surface) between the liquid and the sample mount 51, and the interface (contact surface) between the liquid and air.

Figure 3A:
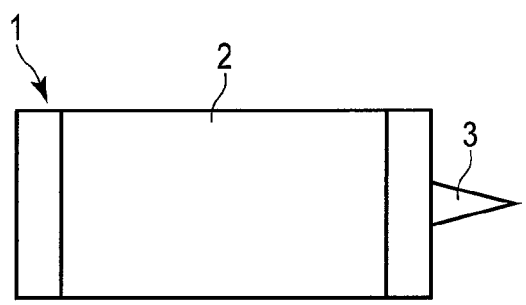
FIG. 3A is a plan view showing a cantilever chip shown in FIGS. 1 and 2.
Figure 3B:
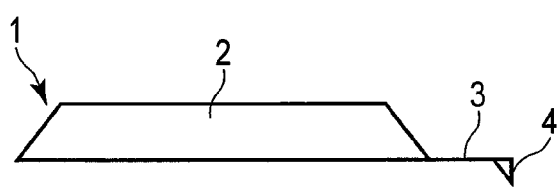
FIG. 3B is a side view showing the cantilever chip shown in FIGS. 1 and 2.
Figure 3C:
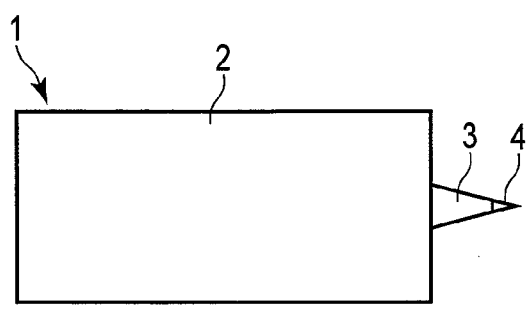
FIG. 3C is a bottom view showing the cantilever chip shown in FIGS. 1 and 2.

As shown in FIGS. 3A, 3B, and 3C, the cantilever chip 1 includes a substrate 2, a cantilever 3 supported by the substrate 2, and a probe 4 provided at the free end of the cantilever 3. The cantilever chip 1 is held by the holder 16 of the scanning mechanism 11. More specifically, the substrate 2 is held so that the inclination angle of the substrate 2 with respect to the X-Y plane becomes 5° to 15°, and desirably 10° to 15°. The substrate 2 is fixed to the holder 16 by an adhesive such as wax.

Figure 4A:
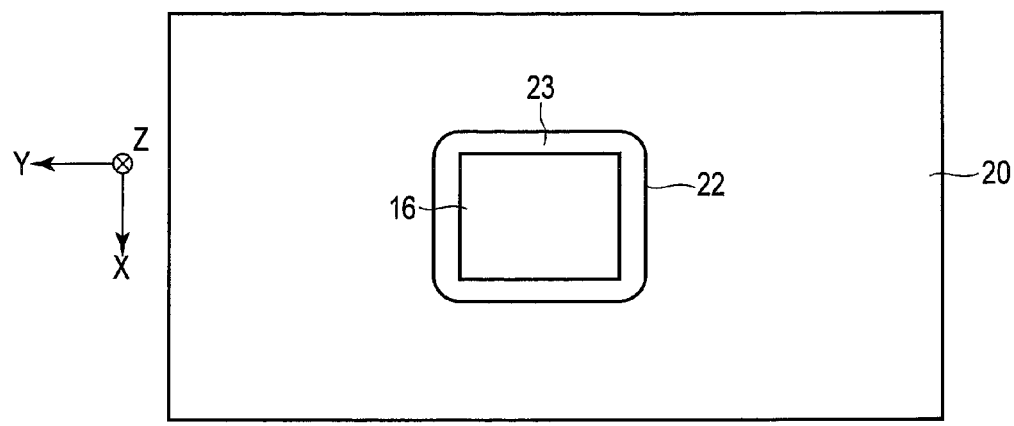
FIG. 4A is a view showing the probe microscope head in FIG. 2 in a state in which the cantilever chip is removed from a holder, when viewed from a liquid cell.
Figure 4B:
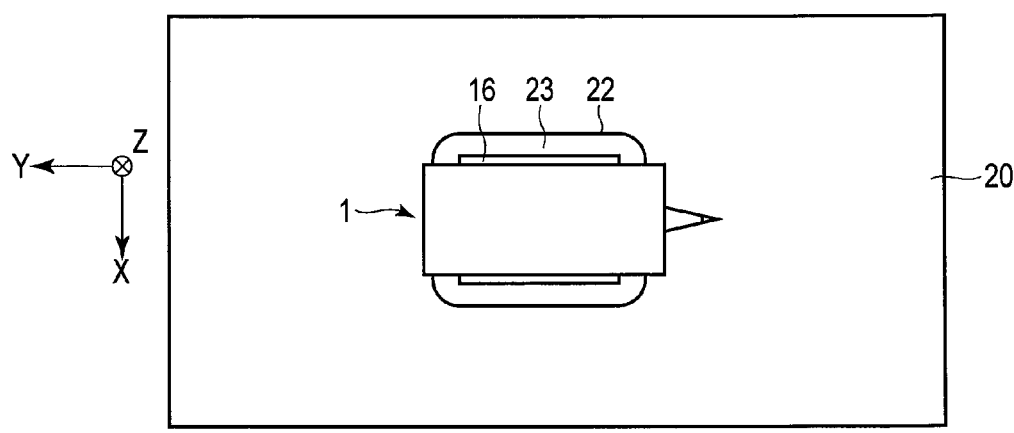
FIG. 4B is a view showing the probe microscope head in FIG. 2 in a state in which the cantilever chip is fixed to the holder, when viewed from the liquid cell.

The cantilever chip 1 is held by the holder 16 so that, for example, the longitudinal direction of the cantilever 3 is along the Y-axis, as shown in FIG. 4B.

The holder 16 is made of a lightweight hard material such as ceramic or aluminum. The holder 16 is formed to be compact so that its volume is triple or less of the volume of the substrate 2, and desirably double or less. For example, when the dimensions of the substrate 2 are 3 mm×1.6 mm×0.3 mm (currently available standard size), the volume of the substrate 2 is 1.44 mm$^3$. In this case, the size of the holder 16 is equal to or smaller than 4.32 mm$^3$, and desirably equal to or smaller than 2.88 mm$^3$.

Referring again to FIG. 2, the probe microscope head 10 also includes a light source 31 to emit detection light 34a of generally parallel light for detecting the displacement of the cantilever 3, a light converging element 32 to converge the detection light 34a from the light source 31 onto the cantilever 3 and to restore detection light reflected by the cantilever 3 into detection light 34b of generally parallel light, and a multi-segments detector 33 to detect a change of the incident position of the detection light 34b. The light source 31, the light converging element 32, and the multi-segments detector 33 constitute a displacement sensor to detect the displacement of the cantilever 3 of the cantilever chip 1. This displacement sensor is, e.g., an optical lever type optical displacement sensor widely used in a scanning probe microscope.

The optical transmission plate 20, which itself is optically transparent, transmits the detection light 34a, 34b for detecting the displacement of the cantilever 3. The detection light 34a having passed through the light converging element 32 passes through the optical transmission plate 20 and falls on the cantilever 3. The detection light 34b reflected by the cantilever 3 passes through the optical transmission plate 20 and enters the light converging element 32.

The light source 31 and the multi-segments detector 33 are held by a housing frame (not shown). The light converging element 32, which is fixed to the X-Y movable portion 12 of the scanning mechanism 11, is scanned by the scanning mechanism 11 together with the cantilever chip 1. The light converging element 32 is constituted by, e.g., a single lens. The light converging element 32 has an optical characteristic in which the NA is equal to or higher than 0.4 so that a converged spot diameter on the cantilever 3 is equal to or smaller than several μm. As the light converging element 32, a compact lightweight light converging element having a size suited to high-speed scanning, e.g., a diameter of 10 mm or less, and desirably 5 mm or less is used.

The scanning probe microscope according to this embodiment operates as follows.

The detection light 34a of generally parallel light emitted by the light source 31 is converged by the light converging element 32, and applied on the cantilever 3 through the optical transmission plate 20, so as to form a converged spot approximately 2 μm in diameter on the cantilever 3.

The detection light 34b reflected by the cantilever 3 passes through the optical transmission plate 20 and then the light converging element 32, so as to restore into generally parallel light, and enters the multi-segments detector 33. The incident position of the detection light 34b onto the multi-segments detector 33 changes in accordance with the Z displacement of the cantilever 3. The multi-segments detector 33 outputs, to the controller 40, a displacement signal reflecting the Z displacement of the cantilever 3.

The controller 40 supplies a scan signal for raster scanning to the X actuator 13 and the Y actuator 14. The X actuator 13 and the Y actuator 14 receive the scan signal from the controller 40, and raster-scan the cantilever chip 1 on the X-Y plane. More specifically, the controller 40 supplies, to the X actuator 13, a high-frequency scanning signal corresponding to the high-speed axis of raster scanning. At the same time, the controller 40 supplies, to the Y actuator 14, a low-frequency scanning signal corresponding to the low-speed axis of raster scanning. The X actuator 13 receives the high-frequency scanning signal from the controller 40, and scans the cantilever chip 1 at high speed along the X-axis. The Y actuator 14 receives the low-frequency scanning signal from the controller 40, and scans the cantilever chip 1 at low speed along the Y-axis. The frequency of the scanning signal output from the controller 40 is equal to or higher than 1 kHz for the high-speed axis (X-axis).

The controller 40 receives the displacement signal of the cantilever 3 from the multi-segments detector 33, and supplies a corresponding scanning signal to the Z actuator 15. The Z actuator 15 receives the scanning signal from the controller 40, and scans the cantilever chip 1 along the Z-axis.

The computer 41 acquires physical information of the sample 50 based on displacement information of the cantilever 3 and scanning information of the scanning mechanism 11, and displays it on a monitor.

In the scanning probe microscope according to this embodiment, the holder 16 is scanned by the scanning mechanism 11, while the optical transmission plate 20 serving as a liquid contact member is not scanned by the scanning mechanism 11. That is, the optical transmission plate 20 is not a scanning target object that is scanned by the scanning mechanism 11. More specifically, the optical transmission plate 20 is joined to the fixed end of the X actuator 13 and the fixed end of the Y actuator 14 through the support member 21, but is not joined to their operation ends. The optical transmission plate 20 is also joined through the elastic member 23 to the holder 16 that is scanned by the X actuator 13, the Y actuator 14, and the Z actuator 15. Since the elastic member 23 elastically deforms and absorbs the motion of the holder 16, the optical transmission plate 20 is not scanned by the scanning mechanism 11. This reduces a liquid motion generated at the time of scanning.

Figure 5:
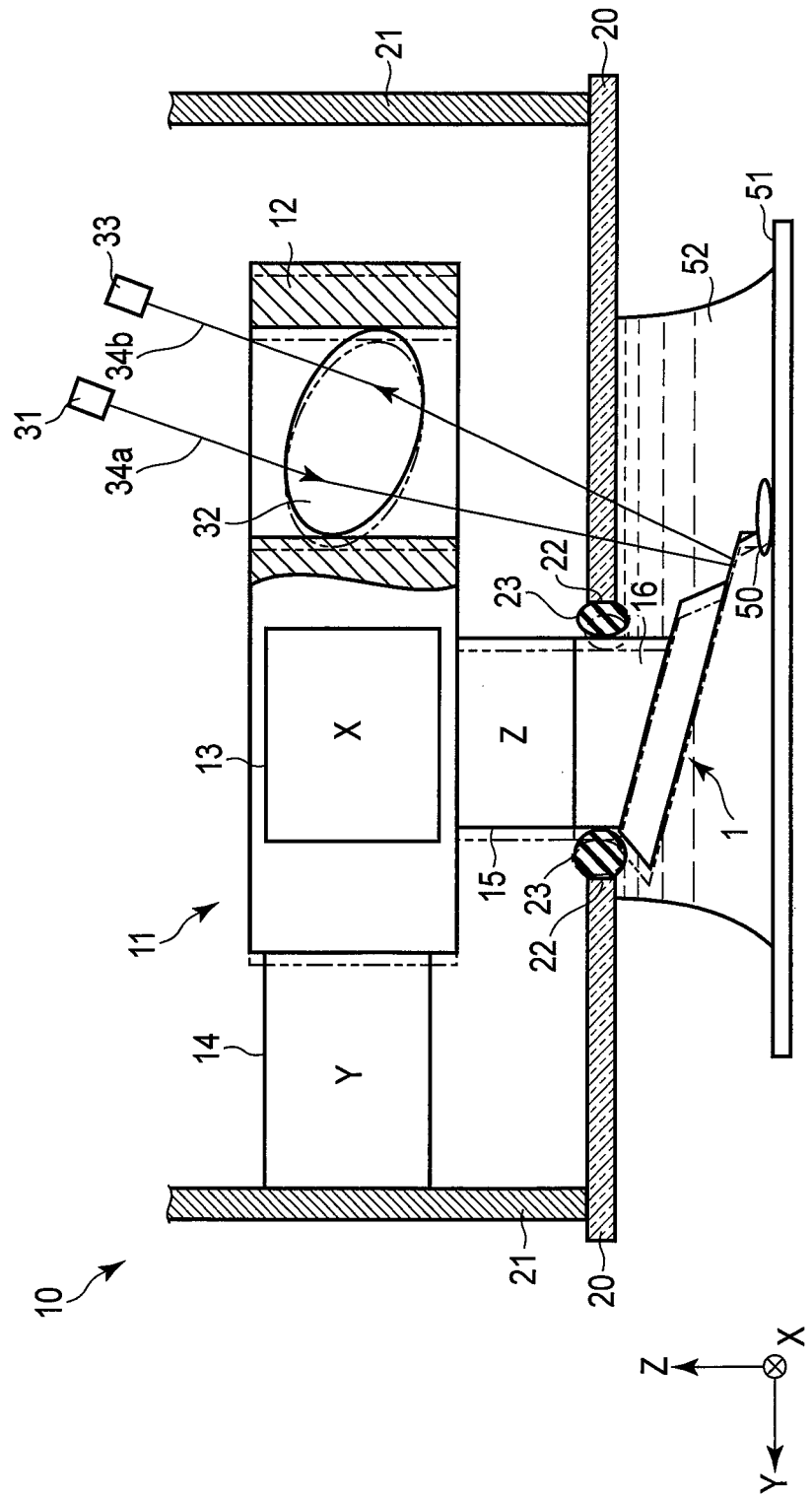
FIG. 5 shows a state in which an X-Y movable portion is scanned in the negative direction along the Y-axis.

At the time of raster scanning, therefore, the distance between the through hole 22 of the optical transmission plate 20 and the holder 16 changes. For example, FIG. 5 shows a state in which the X-Y movable portion 12 is scanned in the negative direction along the Y-axis. In this case, as shown in FIG. 5, the through hole 22 and the holder 16 come close to each other on the negative side along the Y-axis with reference to the holder 16, and move apart from each other on the positive side along the Y-axis. The gap between the through hole 22 and the holder 16 is sealed in a waterproof fashion by the elastic member 23, and the elastic member 23 deforms in accordance with a change of the distance between the through hole 22 and the holder 16, so that waterproofing of the gap between the through hole 22 and the holder 16 is maintained. This can prevent entrance of the liquid into the housing constituted by the support member 21 and the optical transmission plate 20.

In the scanning probe microscope according to this embodiment, the optical transmission plate 20 is not scanned in any scanning along the X-, Y-, and Z-axes. Hence, the shape of the liquid cell 52 formed by sandwiching the liquid between the sample mount 51 and the optical transmission plate 20 does not change. That is, the interface between the liquid cell 52 and air does not move. Only part of the holder 16 and the cantilever chip 1 project from the through hole 22 into the liquid. That is, target objects scanned in the liquid of the liquid cell 52 are minimum members, i.e., only the compact holder 16 and the cantilever chip 1. Thus, the contact area and volume by which the liquid cell and the scanning target object contact each other can be decreased, and vibrations of the liquid generated at the time of scanning can be reduced.

In a scanning probe microscope disclosed in U.S. Pat. No. 8,087,288 introduced in Background Art, even an optical member that is equivalent to the optical transmission plate 20 in this embodiment and forms a liquid cell together with a sample mount is scanned. The shape of the liquid cell therefore changes. That is, the interface between the liquid cell and air moves.

To reduce vibrations of the liquid generated at the time of scanning, it is effective to decrease the volume of the scanning target object present in the liquid and the contact area between the scanning target object and the liquid. Hence, the scanning probe microscope according to this embodiment reduces partial vibrations and convection of the liquid that are generated at the time of scanning, compared to the scanning mechanism in U.S. Pat. No. 8,087,288. As a result, the scanning probe microscope according to this embodiment enables high-precision observation.

Recently, demand has arisen for an AFM capable of high-speed scanning so that the motion of a biological sample can be observed. This AFM aims to obtain one frame within 1 sec, and desirably within 0.1 sec.

For example, when the X-axis direction is set as the high-speed direction of raster scanning, the Y-axis direction is set as the low-speed direction of raster scanning, and an image of 100 pixels in the X-axis direction×100 pixels in the Y-axis direction is captured in 0.1 sec, the scanning frequency in the X-axis direction becomes 1 kHz, the scanning frequency in the Y-axis direction becomes 10 Hz, and the scanning frequency in the Z-axis direction reaches 100 kHz or higher. This speed is 10 to 100 times higher than the speed of the conventional AFM.

However, the liquid is viscous, and the magnitude of the viscous resistance increases in proportion to the scanning frequency. If the scanning speed increases, the influence of vibrations of the liquid increases proportionally.

Figure 6:
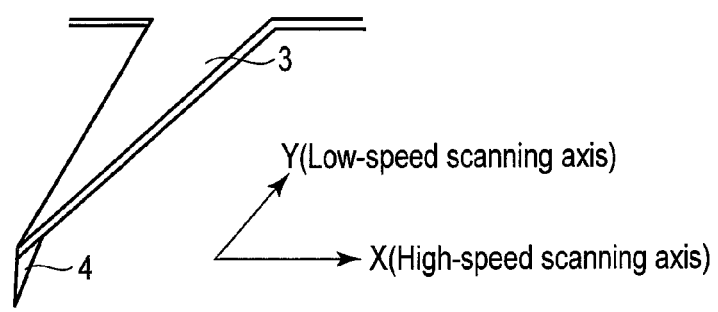
FIG. 6 shows the arrangement relationship between the longitudinal direction of the cantilever and the scanning axis.

In the scanning probe microscope according to this embodiment, the cantilever 3 is raster-scanned at high speed along the X-axis and at low speed along the Y-axis. As described above, the cantilever 3 is arranged so that its longitudinal direction is along the Y-axis, as shown in FIG. 6.

Figure 7A:
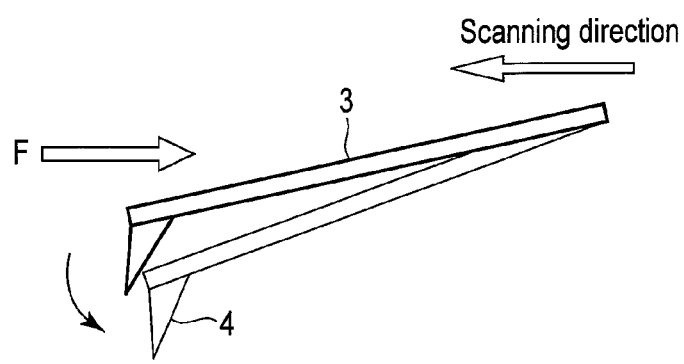
FIG. 7A shows the deformation of the cantilever generated when the cantilever is scanned in its longitudinal direction.
Figure 7B:
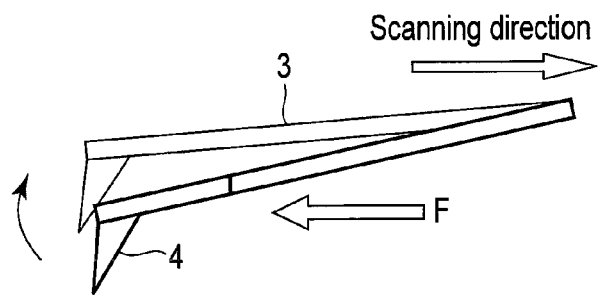
FIG. 7B shows the deformation of the cantilever generated when the cantilever is scanned in its longitudinal direction.

As shown in FIGS. 7A and 7B, at the time of scanning in the longitudinal direction (Y-axis direction) of the cantilever 3, the viscous resistance of the liquid is readily generated, and the cantilever 3 readily deforms. The convection of the liquid also increases. The magnitude of the viscous resistance is proportional to the scanning frequency.

More specifically, the magnitude of the viscous resistance generated at the time of scanning along the Y-axis serving as the longitudinal direction of the cantilever 3 is proportional to the product of an area Sy of the lever surface of the cantilever 3 projected onto the X-Z plane, and a scanning frequency fy. The magnitude of the viscous resistance generated at the time of scanning along the X-axis is proportional to the product of an area Sx of the side surface of the cantilever 3 projected onto the Y-Z plane, and a scanning frequency fx.

For example, assume that the cantilever 3 is held at an angle of 12° with respect to the sample surface, the length of the cantilever 3 is 10 μm, the width of the proximal end is 4 μm, and the thickness is 0.1 μm (general values of the dimensions of a cantilever used for high-speed observation in liquid). Then, the area Sy is 10 μm×4 μm×1/2×sin(12°) =4.16 μm$^2$, and the area Sx is 10 μm×0.1 μm=1 μm$^2$. The area Sy is four times larger than the area Sx. Therefore, the magnitude of the viscous resistance generated at the time of scanning in the longitudinal direction (Y-axis direction) of the cantilever 3 is four times larger, compared to scanning along the X-axis. Further, the cantilever 3 has a shape that is readily deformed by a force along the Y-axis, and is hardly deformed by a force along the X-axis. Thus, the deformation amount of the cantilever 3 generated at the time of scanning in the longitudinal direction (Y-axis direction) of the cantilever 3 is much more than 4 times, compared to scanning along the X-axis.

In the scanning probe microscope, the holder 16 holds the cantilever chip 1 so that the longitudinal direction of the cantilever 3 coincides with the low-speed Y-axis direction. The influence of the viscous resistance of the liquid is suppressed to be small, and higher-precision scanning becomes possible.

In the AFM capable of high-speed scanning to observe the motion of a biological sample, since the scanning frequency in the X-axis direction reaches 1 kHz, the AFM has a problem that the influence of the viscous resistance of liquid becomes especially serious.

The scanning probe microscope can reduce vibrations of liquid generated at the time of scanning and is effective particularly when high-speed scanning is necessary.

The optical transmission plate 20 is directly fixed to the support member 21 supporting the scanning mechanism 11 in this embodiment, but may be indirectly fixed to the support member 21 through another member.

Second Embodiment

Figure 9:
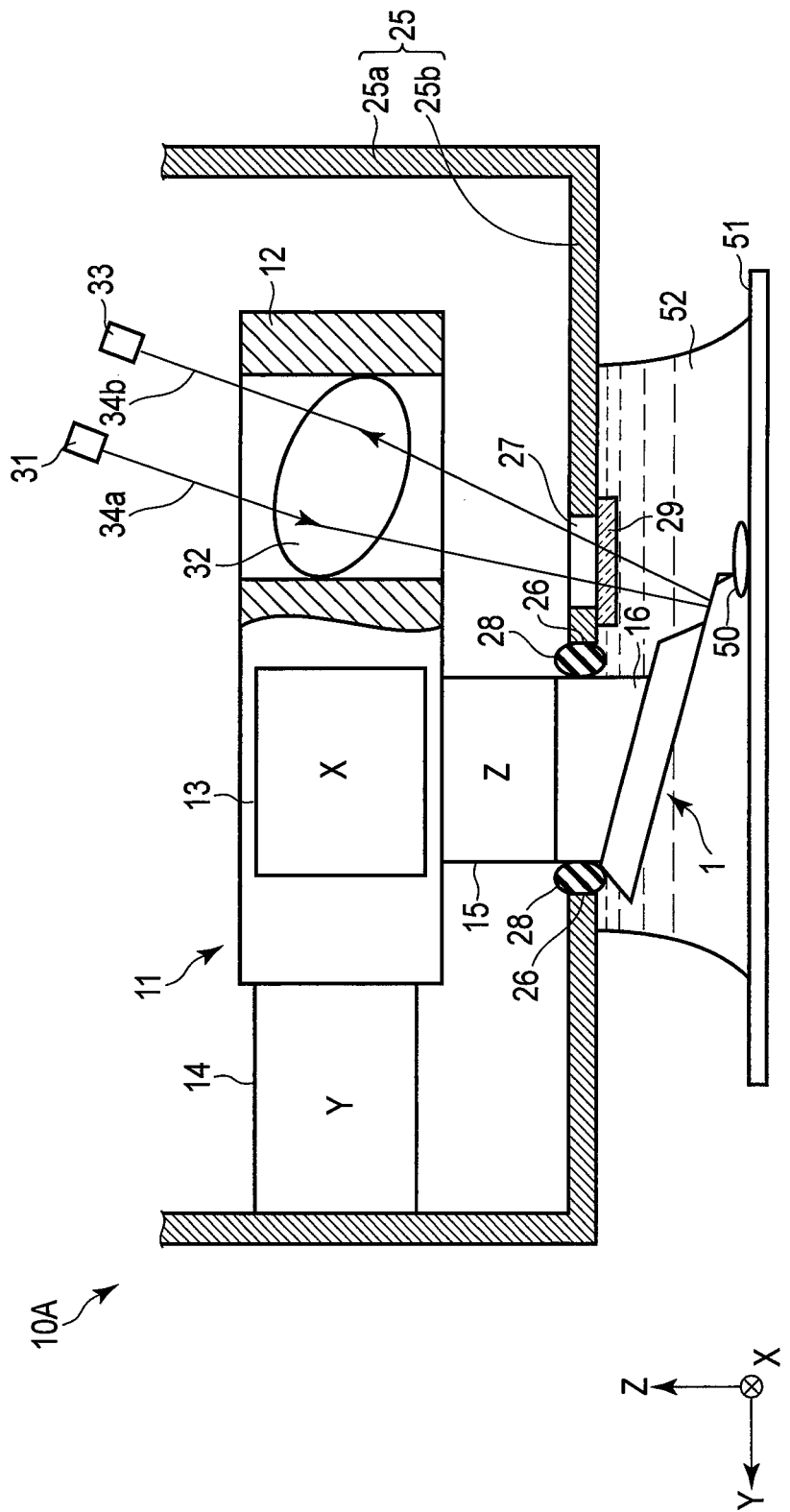
FIG. 9 is an enlarged view showing a probe microscope head shown in FIG. 8.

FIG. 8 shows a scanning probe microscope according to this embodiment. FIGS. 9, 10A, and 10B show a probe microscope head. In FIGS. 8, 9, 10A, and 10B, the same reference numerals as those in FIGS. 1, 2, 4A, and 4B denote the same parts, and a detailed description thereof will not be repeated.

As shown in FIG. 8, the scanning probe microscope according to this embodiment is different in the probe microscope head from the scanning probe microscope according to the first embodiment. As shown in FIG. 9, a probe microscope head 10A according to this embodiment is different from the probe microscope head 10 according to the first embodiment in a housing to contain a scanning mechanism 11. In the probe microscope head 10A, the housing to contain the scanning mechanism 11 is constituted by a basic housing 25 and an optical transmission plate 29. In other words, the probe microscope head 10A according to this embodiment is constituted by replacing the support member 21 and optical transmission plate 20 of the probe microscope head 10 according to the first embodiment with the basic housing 25 and the optical transmission plate 29.

The basic housing 25 is constituted by a peripheral wall portion 25a surrounding the scanning mechanism 11, and a bottom portion 25b closing the lower end of the peripheral wall portion 25a. The bottom portion 25b has a through hole 26, and a holder 16 extends through the through hole 26. The gap between the holder 16 and the through hole 26 is sealed in a waterproof fashion by an elastic member 28. Part of the holder 16 and a cantilever chip 1 project into a liquid cell 52 through the through hole 26. The elastic member 28 is made of a soft adhesive suitable for waterproofing, such as silicone rubber. Although part of the holder 16 projects into the liquid cell 52 in FIG. 9, the entire holder 16 may project into the liquid cell 52.

Further, the bottom portion 25b of the basic housing 25 has another through hole 27. The optical transmission plate 29 is an optically transparent plate made of glass or resin, and closes the through hole 27. The optical transmission plate 29 is adhered and fixed to the bottom portion 25b so as to maintain waterproofing. The through hole 27 and the optical transmission plate 29 constitute an optical transmission portion to transmit detection light 34a, 34b for detecting the displacement of the cantilever 3.

The bottom portion 25b and the optical transmission plate 29 constitute a liquid contact member including an optical transmission portion. The bottom portion 25b and the optical transmission plate 29 are arranged in contact with liquid on the sample mount 51, so as to cooperate with the sample mount 51 to sandwich the liquid, forming the liquid cell 52 for measuring a sample 50 in an in-liquid environment. That is, the bottom portion 25b and the optical transmission plate 29 include a cell forming portion to form the liquid cell 52 together with the sample mount 51. In this embodiment, the shape of the region of the liquid cell 52 is determined by the interface (contact surface) between the liquid and the liquid contact member (including part of the holder 16 and the cantilever chip 1) constituted by the bottom portion 25b and the optical transmission plate 29, the interface (contact surface) between the sample mount 51 and the liquid, and the interface between air and the liquid.

The holder 16 holds the cantilever chip 1 so that, for example, the longitudinal direction of the cantilever 3 is along the Y-axis, as shown in FIG. 10B.

The scanning probe microscope having the above arrangement according to this embodiment has the same advantages as those of the scanning probe microscope according to the first embodiment, and also has the following advantages.

The optical transmission plate 20 in the probe microscope head 10 according to the first embodiment is made of, e.g., glass or resin. The glass is fragile (chips easily). The resin readily causes aged deterioration. The influence of these factors becomes more serious as the size (area) of the optical transmission plate 20 becomes larger. To the contrary, in the probe microscope head 10A according to this embodiment, since the area of the optical transmission plate 29 is small, the above-mentioned influence can be reduced.

In this embodiment, the member to form the liquid cell together with the sample mount 51 is constituted by part of the basic housing 25, that is, the bottom portion 25b. However, the present invention is not limited to this, and this member may be constituted by a member not scanned by the scanning mechanism 11, e.g., a plate-like member fixed to the basic housing 25.

Third Embodiment

Figure 11:
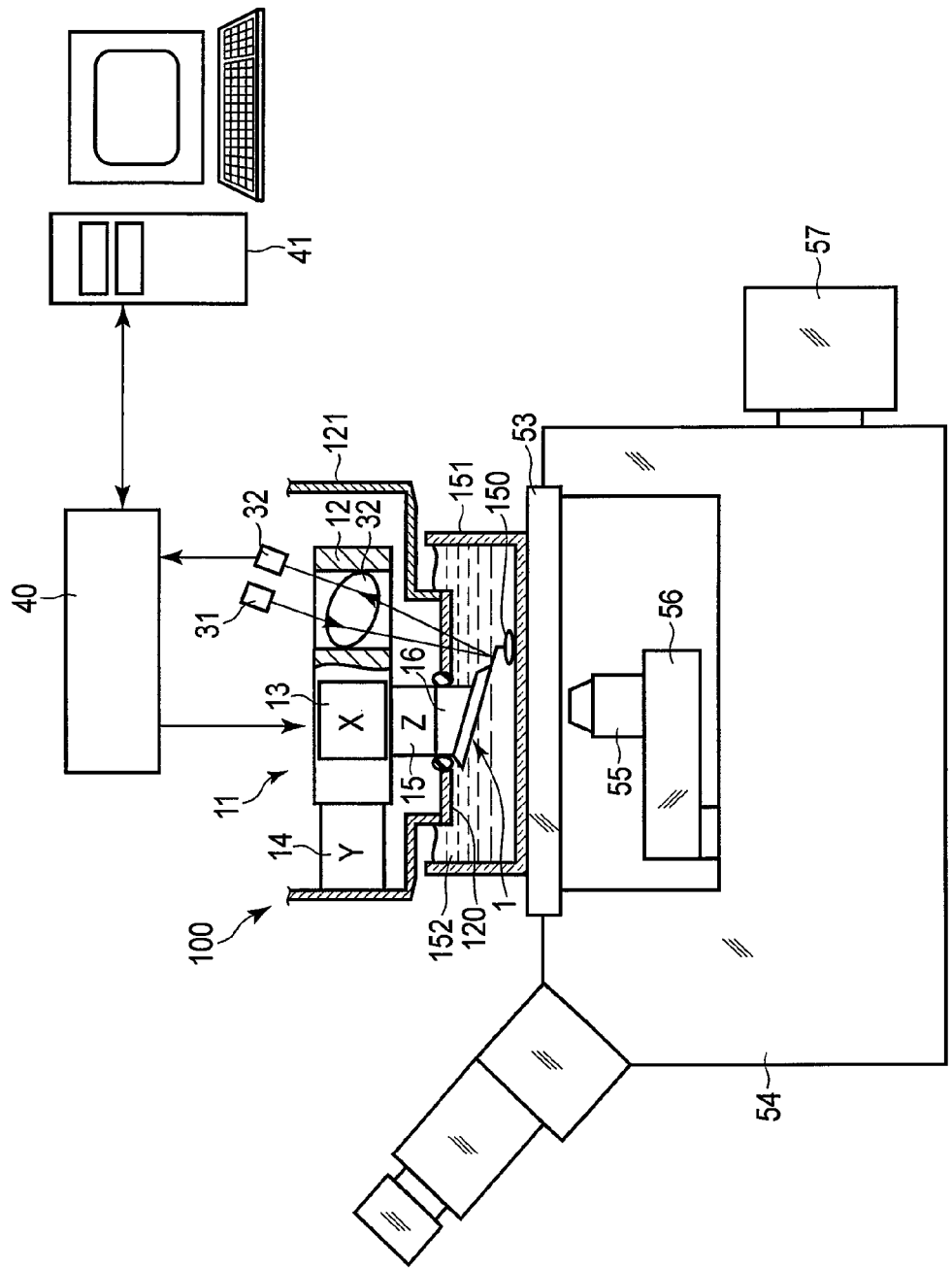
FIG. 11 shows a scanning probe microscope according to a third embodiment.

A scanning probe microscope according to this embodiment is mounted in an inverted optical microscope serving as an optical microscope, as shown in FIG. 11.

The inverted optical microscope includes a microscope housing 54, a microscope stage 53, an objective lens 55, a revolver 56, and an epi-illumination light source 57. A sample mount 151 such as a dish is set on the microscope stage 53, and a sample 150 is held on the sample mount 151. The inverted optical microscope is mainly used for in-liquid optical observation of the sample 150.

The scanning probe microscope according to this embodiment is to measure the sample 150 set on the sample mount 151 in liquid. The scanning probe microscope includes a probe microscope head 100, a controller 40 to control the probe microscope head 100, and a computer 41 to process information obtained by the probe microscope head 100. The probe microscope head 100 is supported above the microscope stage 53 by a column (not shown).

Figure 12:
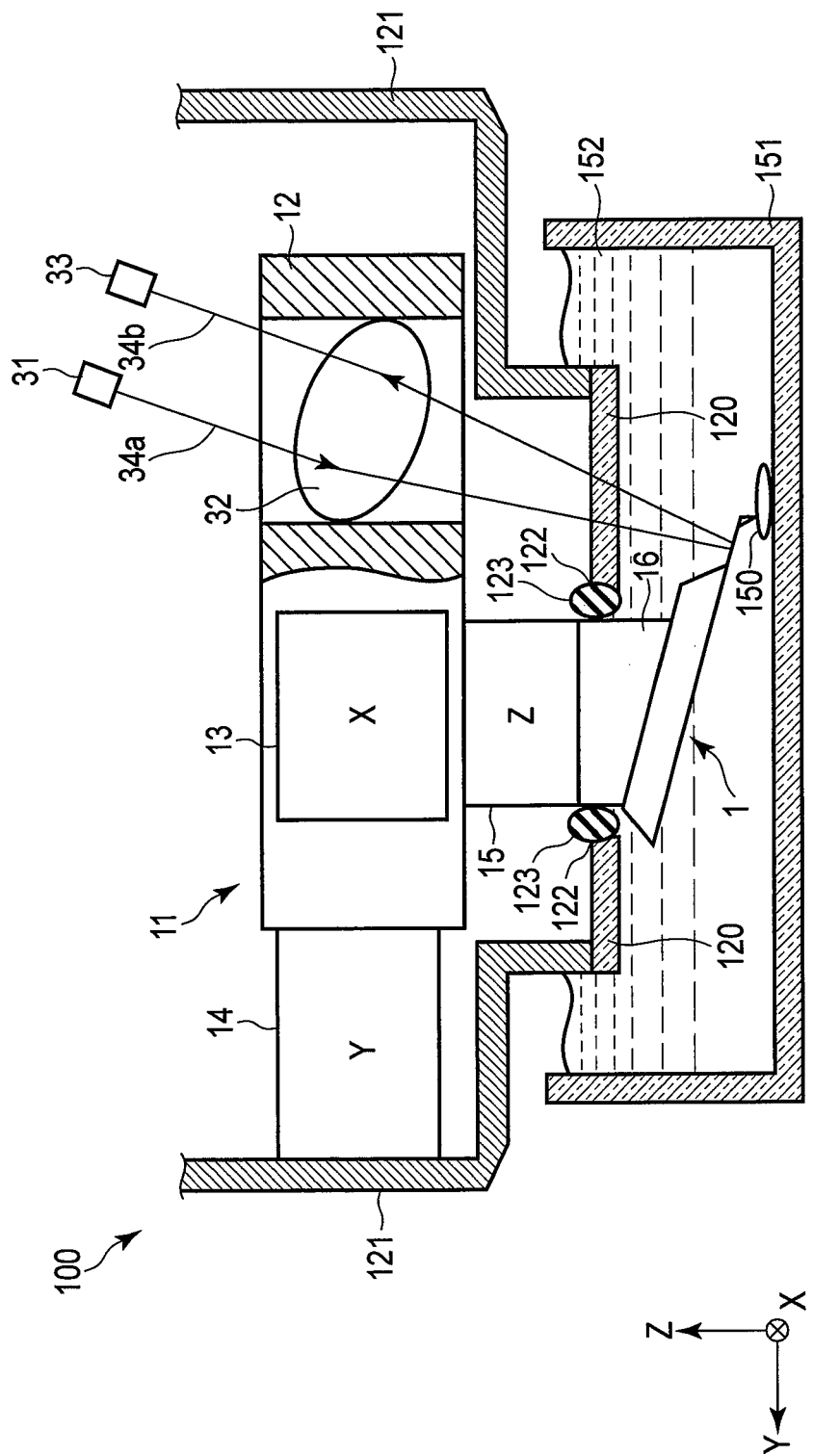
FIG. 12 is an enlarged view showing a probe microscope head shown in FIG. 11.

As shown in FIG. 12, the probe microscope head 100 includes a scanning mechanism 11 to scan a cantilever chip 1 along the X-, Y-, and Z-axes perpendicular to each other, a support member 121 supporting the scanning mechanism 11, and an optical transmission plate 120 supported by the support member 121.

The scanning mechanism 11 includes a holder 16 to hold the cantilever chip 1, a Z actuator 15 to move the holder 16 along the Z-axis, an X-Y movable portion 12 holding the Z actuator 15, an X actuator 13 to move the X-Y movable portion 12 along the X-axis, and a Y actuator 14 to move the X-Y movable portion 12 along the Y-axis. The X actuator 13 and the Y actuator 14 constitute an X-Y scanner to raster-scan the cantilever chip 1 along the X- and Y-axes. The X actuator 13, the Y actuator 14, and the Z actuator 15 are constituted by, e.g., multilayer piezoelectric elements.

The support member 121 has, e.g., a shape in which a convex is reversed, which may be referred as a reverse convex shape below. The scanning mechanism 11 is arranged inside the support member 121, and both the X actuator 13 and the Y actuator 14 are fixed to the support member 121.

The optical transmission plate 120 is fixed to the lower end of the support member 121, and closes the opening at the lower end of the support member 121 in reverse convex shape. The optical transmission plate 120 is an optically transparent plate and is made of, e.g., glass or resin. The support member 121 and the optical transmission plate 120 constitute a housing to contain the scanning mechanism 11. The support member 121 and the optical transmission plate 120 are fixed by adhesion or screwing.

The optical transmission plate 120 is a liquid contact member including an optical transmission portion. The optical transmission plate 120 is arranged in contact with liquid on the sample mount 151, so as to cooperate with the sample mount 151 to sandwich the liquid, forming a liquid cell 152 for measuring the sample 150 in an in-liquid environment. That is, the optical transmission plate 120 includes a cell forming portion to form the liquid cell 152 together with the sample mount 151.

The optical transmission plate 120 has a through hole 122, and the holder 16 extends through the through hole 122. The gap between the holder 16 and the through hole 122 is sealed in a waterproof fashion by an elastic member 123. Part of the holder 16 and the cantilever chip 1 project into the liquid cell 152 through the through hole 122. The elastic member 123 is made of a soft adhesive suitable for waterproofing, such as silicone rubber. Although part of the holder 16 projects into the liquid cell 152 in FIG. 12, the entire holder 16 may project into the liquid cell 152.

In this specification, the liquid cell 152 is a spatial region (environmental region) filled with liquid in order to measure a sample in the liquid. Formation of the liquid cell 152 is to decide the shape of the region of the liquid cell 152. In this embodiment, the shape of the region of the liquid cell 152 is determined by the interface (contact surface) between the liquid and the optical transmission plate 120 (including part of the holder 16 and the cantilever chip 1), the interface (contact surface) between the liquid and the sample mount 151, and the interface (contact surface) between the liquid and air.

As shown in FIGS. 3A, 3B, and 3C, the cantilever chip 1 includes a substrate 2, a cantilever 3 supported by the substrate 2, and a probe 4 provided at the free end of the cantilever 3. The cantilever chip 1 is held by the holder 16 of the scanning mechanism 11. More specifically, the substrate 2 is held so that the inclination angle of the substrate 2 with respect to the X-Y plane becomes 5° to 15°, and desirably 10° to 15°. The substrate 2 is fixed to the holder 16 by an adhesive such as wax.

Figure 13A:
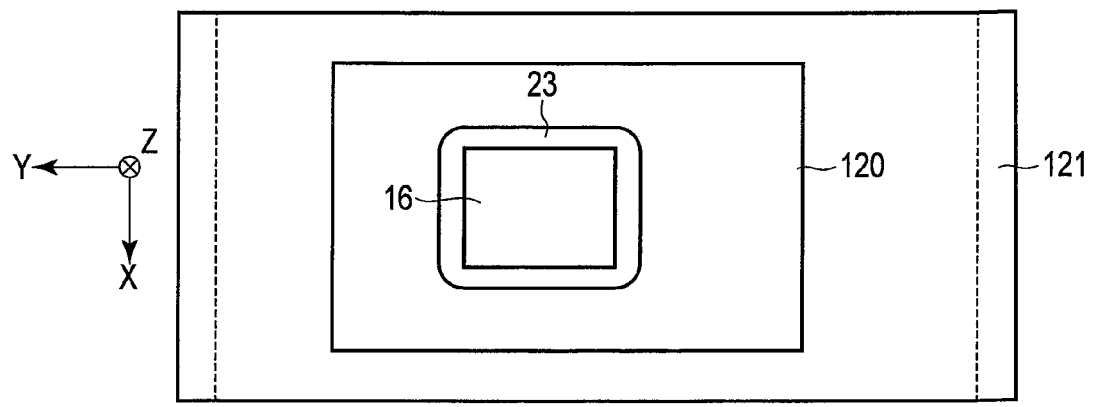
FIG. 13A is a view showing the probe microscope head in FIG. 11 in a state in which a cantilever chip is removed from a holder, when viewed from a liquid cell.
Figure 13B:
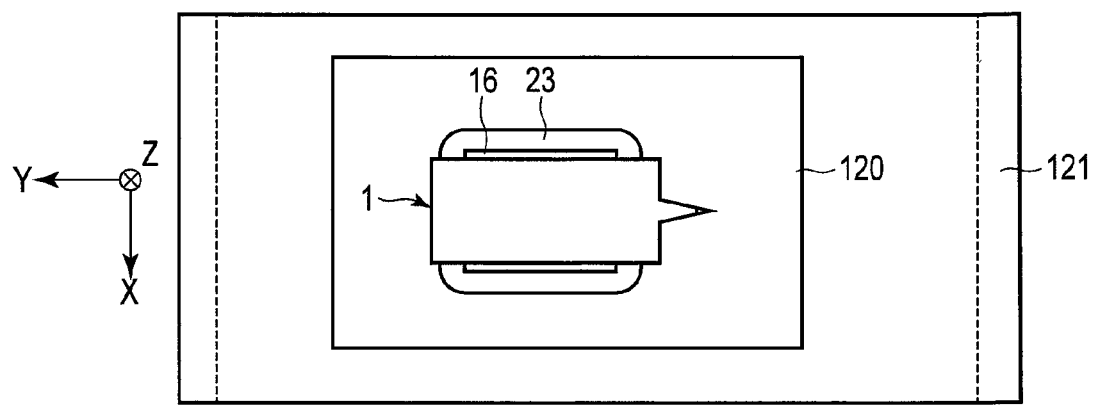
FIG. 13B is a view showing the probe microscope head in FIG. 11 in a state in which the cantilever chip is fixed to the holder, when viewed from the liquid cell.

The cantilever chip 1 is held by the holder 16 so that, for example, the longitudinal direction of the cantilever 3 is along the Y-axis, as shown in FIG. 13B.

The holder 16 is made of a lightweight hard material such as ceramic or aluminum. The holder 16 is formed to be compact so that its volume is triple or less of the volume of the substrate 2, and desirably double or less. For example, when the dimensions of the substrate 2 are 3 mm×1.6 mm×0.3 mm (currently available standard size), the volume of the substrate 2 is 1.44 mm$^3$. In this case, the size of the holder 16 is equal to or smaller than 4.32 mm³, and desirably equal to or smaller than 2.88 mm³.

Referring again to FIG. 12, the probe microscope head 100 also includes a light source 31 to emit detection light 34a of generally parallel light for detecting the displacement of the cantilever 3, a light converging element 32 to converge the detection light 34a from the light source 31 onto the cantilever 3 and to restore detection light reflected by the cantilever 3 into detection light 34b of generally parallel light, and a multi-segments detector 33 to detect a change of the incident position of the detection light 34b. The light source 31, the light converging element 32, and the multi-segments detector 33 constitute a displacement sensor to detect the displacement of the cantilever 3 of the cantilever chip 1. This displacement sensor is, e.g., an optical lever type optical displacement sensor widely used in a scanning probe microscope.

The optical transmission plate 120, which itself is optically transparent, transmits the detection light 34a, 34b for detecting the displacement of the cantilever 3. The detection light 34a having passed through the light converging element 32 passes through the optical transmission plate 120 and falls on the cantilever 3. The detection light 34b reflected by the cantilever 3 passes through the optical transmission plate 120 and enters the light converging element 32.

The light source 31 and the multi-segments detector 33 are held by a housing frame (not shown). The light converging element 32, which is fixed to the X-Y movable portion 12 of the scanning mechanism 11, is scanned by the scanning mechanism 11 together with the cantilever chip 1. The light converging element 32 is constituted by, e.g., a single lens. The light converging element 32 has an optical characteristic in which the NA is equal to or higher than 0.4 so that a converged spot diameter on the cantilever 3 is equal to or smaller than several μm. As the light converging element 32, a compact lightweight light converging element having a size suited to high-speed scanning, e.g., a diameter of 10 mm or less, and desirably 5 mm or less is used.

The scanning probe microscope according to this embodiment operates as follows.

The detection light 34a of generally parallel light emitted by the light source 31 is converged by the light converging element 32, and applied on the cantilever 3 through the optical transmission plate 120, so as to form a converged spot approximately 2 μm in diameter on the cantilever 3.

The detection light 34b reflected by the cantilever 3 passes through the optical transmission plate 120 and then the light converging element 32, so as to restore into generally parallel light, and enters the multi-segments detector 33. The incident position of the detection light 34b onto the multi-segments detector 33 changes in accordance with the Z displacement of the cantilever 3. The multi-segments detector 33 outputs, to the controller 40, a displacement signal reflecting the Z displacement of the cantilever 3.

The controller 40 supplies a scan signal for raster scanning to the X actuator 13 and the Y actuator 14. The X actuator 13 and the Y actuator 14 receive the scan signal from the controller 40, and raster-scan the cantilever chip 1 on the X-Y plane. More specifically, the controller 40 supplies, to the X actuator 13, a high-frequency scanning signal corresponding to the high-speed axis of raster scanning. At the same time, the controller 40 supplies, to the Y actuator 14, a low-frequency scanning signal corresponding to the low-speed axis of raster scanning. The X actuator 13 receives the high-frequency scanning signal from the controller 40, and scans the cantilever chip 1 at high speed along the X-axis. The Y actuator 14 receives the low-frequency scanning signal from the controller 40, and scans the cantilever chip 1 at low speed along the Y-axis. The frequency of the scanning signal output from the controller 40 is equal to or higher than 1 kHz for the high-speed axis (X-axis).

The controller 40 receives the displacement signal of the cantilever 3 from the multi-segments detector 33, and supplies a corresponding scanning signal to the Z actuator 15. The Z actuator 15 receives the scanning signal from the controller 40, and scans the cantilever chip 1 along the Z-axis.

The computer 41 acquires physical information of the sample 150 based on displacement information of the cantilever 3 and scanning information of the scanning mechanism 11, and displays it on a monitor.

In the scanning probe microscope according to this embodiment, the holder 16 is scanned by the scanning mechanism 11, while the optical transmission plate 120 serving as a liquid contact member is not scanned by the scanning mechanism 11. That is, the optical transmission plate 120 is not a scanning target object that is scanned by the scanning mechanism 11. More specifically, the optical transmission plate 120 is joined to the fixed end of the X actuator 13 and the fixed end of the Y actuator 14 through the support member 121, but is not joined to their operation ends. The optical transmission plate 120 is also joined through the elastic member 123 to the holder 16 that is scanned by the X actuator 13, the Y actuator 14, and the Z actuator 15, Since the elastic member 123 elastically deforms and absorbs the motion of the holder 16, the optical transmission plate 120 is not scanned by the scanning mechanism 11. This reduces a liquid motion generated at the time of scanning.

The gap between the through hole 122 and the holder 16 is sealed in a waterproof fashion by the elastic member 123, and the elastic member 123 deforms in accordance with a change of the distance between the through hole 122 and the holder 16, so that waterproofing of the gap between the through hole 122 and the holder 16 is maintained. This can prevent entrance of the liquid into the housing constituted by the support member 121 and the optical transmission plate 120.

In the scanning probe microscope according to this embodiment, the optical transmission plate 120 is not scanned in any scanning along the X-, Y-, and Z-axes. Hence, the shape of the liquid cell 152 formed by sandwiching the liquid between the sample mount 151 and the optical transmission plate 120 does not change. That is, the interface between the liquid cell 152 and air does not move. Only part of the holder 16 and the cantilever chip 1 project from the through hole 122 into the liquid. That is, target objects scanned in the liquid of the liquid cell 152 are minimum members, i.e., only the compact holder 16 and the cantilever chip 1. Thus, the contact area and volume by which the liquid cell and the scanning target object contact each other can be decreased, and vibrations of the liquid generated at the time of scanning can be reduced.

In a scanning probe microscope disclosed in U.S. Pat. No. 8,087,288 introduced in Background Art, even an optical member that is equivalent to the optical transmission plate 120 in this embodiment and forms a liquid cell together with a sample mount is scanned. The shape of the liquid cell therefore changes. That is, the interface between the liquid cell and air moves.

To reduce vibrations of the liquid generated at the time of scanning, it is effective to decrease the volume of the scanning target object present in the liquid and the contact area between the scanning target object and the liquid. Hence, the scanning probe microscope according to this embodiment reduces partial vibrations and convection of the liquid that are generated at the time of scanning, compared to the scanning mechanism in U.S. Pat. No. 8,087,288. As a result, the scanning probe microscope according to this embodiment enables high-precision observation.

Recently, demand has arisen for an AFM capable of high-speed scanning so that the motion of a biological sample can be observed. This AFM aims to obtain one frame within 1 sec, and desirably within 0.1 sec.

For example, when the X-axis direction is set as the high-speed direction of raster scanning, the Y-axis direction is set as the low-speed direction of raster scanning, and an image of 100 pixels in the X-axis direction×100 pixels in the Y-axis direction is captured in 0.1 sec, the scanning frequency in the X-axis direction becomes 1 kHz, the scanning frequency in the Y-axis direction becomes 10 Hz, and the scanning frequency in the Z-axis direction reaches 100 kHz or higher. This speed is 10 to 100 times higher than the speed of the conventional AFM.

However, the liquid is viscous, and the magnitude of the viscous resistance increases in proportion to the scanning frequency. If the scanning speed increases, the influence of vibrations of the liquid increases proportionally.

In the scanning probe microscope according to this embodiment, the cantilever 3 is raster-scanned at high speed along the X-axis and at low speed along the Y-axis. As described above, the cantilever 3 is arranged so that its longitudinal direction is along the Y-axis, as shown in FIG. 6.

As shown in FIGS. 7A and 7B, at the time of scanning in the longitudinal direction (Y-axis direction) of the cantilever 3, the viscous resistance of the liquid is readily generated, and the cantilever 3 readily deforms. The convection of the liquid also increases. The magnitude of the viscous resistance is proportional to the scanning frequency.

More specifically, the magnitude of the viscous resistance generated at the time of scanning along the Y-axis serving as the longitudinal direction of the cantilever 3 is proportional to the product of an area Sy of the lever surface of the cantilever 3 projected onto the X-Z plane, and a scanning frequency fy. The magnitude of the viscous resistance generated at the time of scanning along the X-axis is proportional to the product of an area Sx of the side surface of the cantilever 3 projected onto the Y-Z plane, and a scanning frequency fx.

For example, assume that the cantilever 3 is held at an angle of 12° with respect to the sample surface, the length of the cantilever 3 is 10 μm, the width of the proximal end is 4 μm, and the thickness is 0.1 μm (general values of the dimensions of a cantilever used for high-speed observation in liquid). Then, the area Sy is 10 μm×4 μm×1/2×sin (12°)=4.16 μm², and the area Sx is 10 μm×0.1 μm=1 μm². The area Sy is four times larger than the area Sx. Therefore, the magnitude of the viscous resistance generated at the time of scanning in the longitudinal direction (Y-axis direction) of the cantilever 3 is four times larger, compared to scanning along the X-axis. Further, the cantilever 3 has a shape that is readily deformed by a force along the Y-axis, and is hardly deformed by a force along the X-axis. Thus, the deformation amount of the cantilever 3 generated at the time of scanning in the longitudinal direction (Y-axis direction) of the cantilever 3 is much more than 4 times, compared to scanning along the X-axis.

In the scanning probe microscope, the holder 16 holds the cantilever chip 1 so that the longitudinal direction of the cantilever 3 coincides with the low-speed Y-axis direction. The influence of the viscous resistance of the liquid is suppressed to be small, and higher-precision scanning becomes possible.

In the AFM capable of high-speed scanning to observe the motion of a biological sample, since the scanning frequency in the X-axis direction reaches 1 kHz, the AFM has a problem that the influence of the viscous resistance of liquid becomes especially serious.

The scanning probe microscope can reduce vibrations of liquid generated at the time of scanning and is effective particularly when high-speed scanning is necessary.

The optical transmission plate 120 is directly fixed to the support member 121 supporting the scanning mechanism 11 in this embodiment, but may be indirectly fixed to the support member 121 through another member.

Fourth Embodiment

Figure 14:
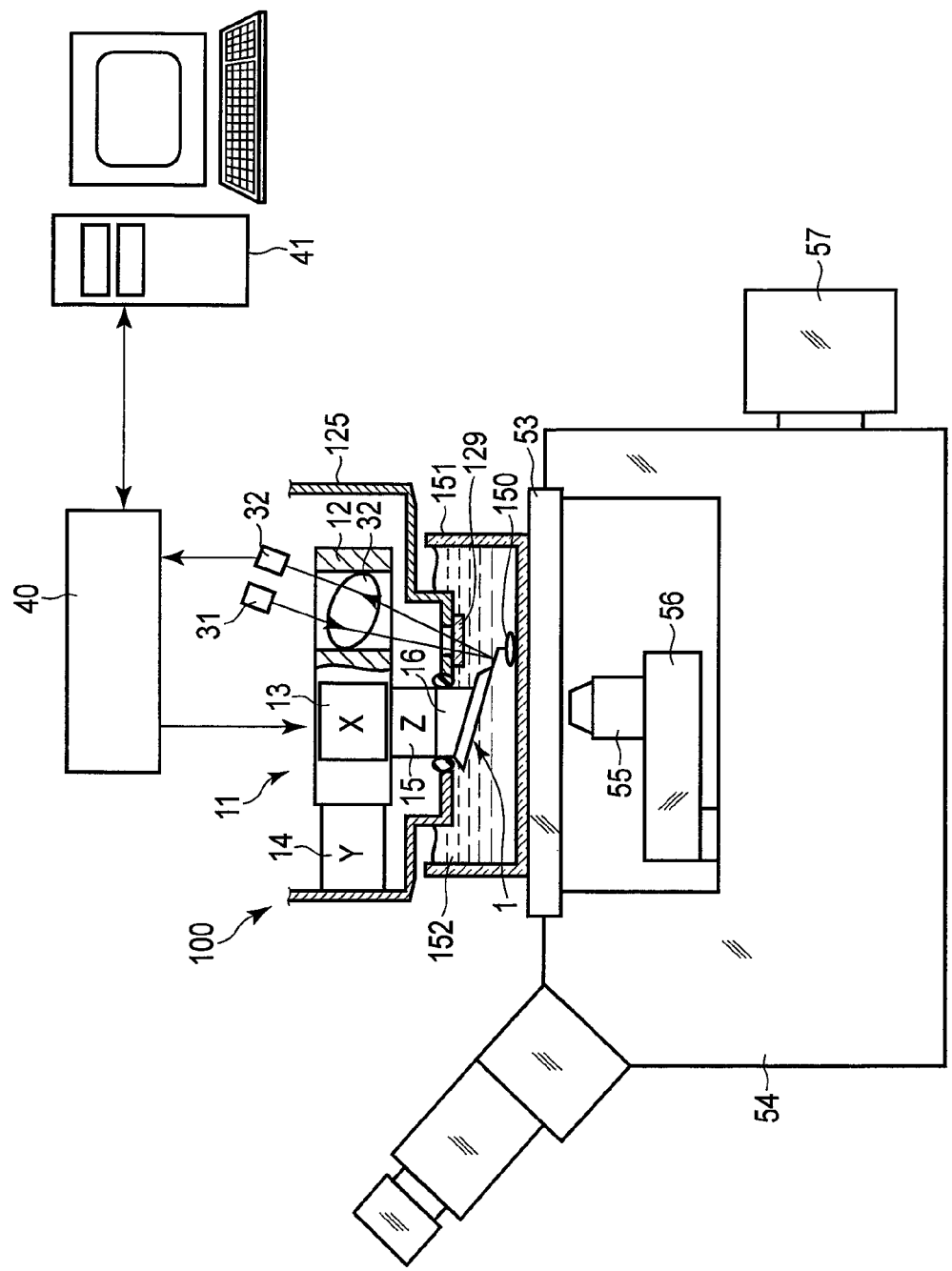
FIG. 14 shows a scanning probe microscope according to a fourth embodiment.
Figure 15:
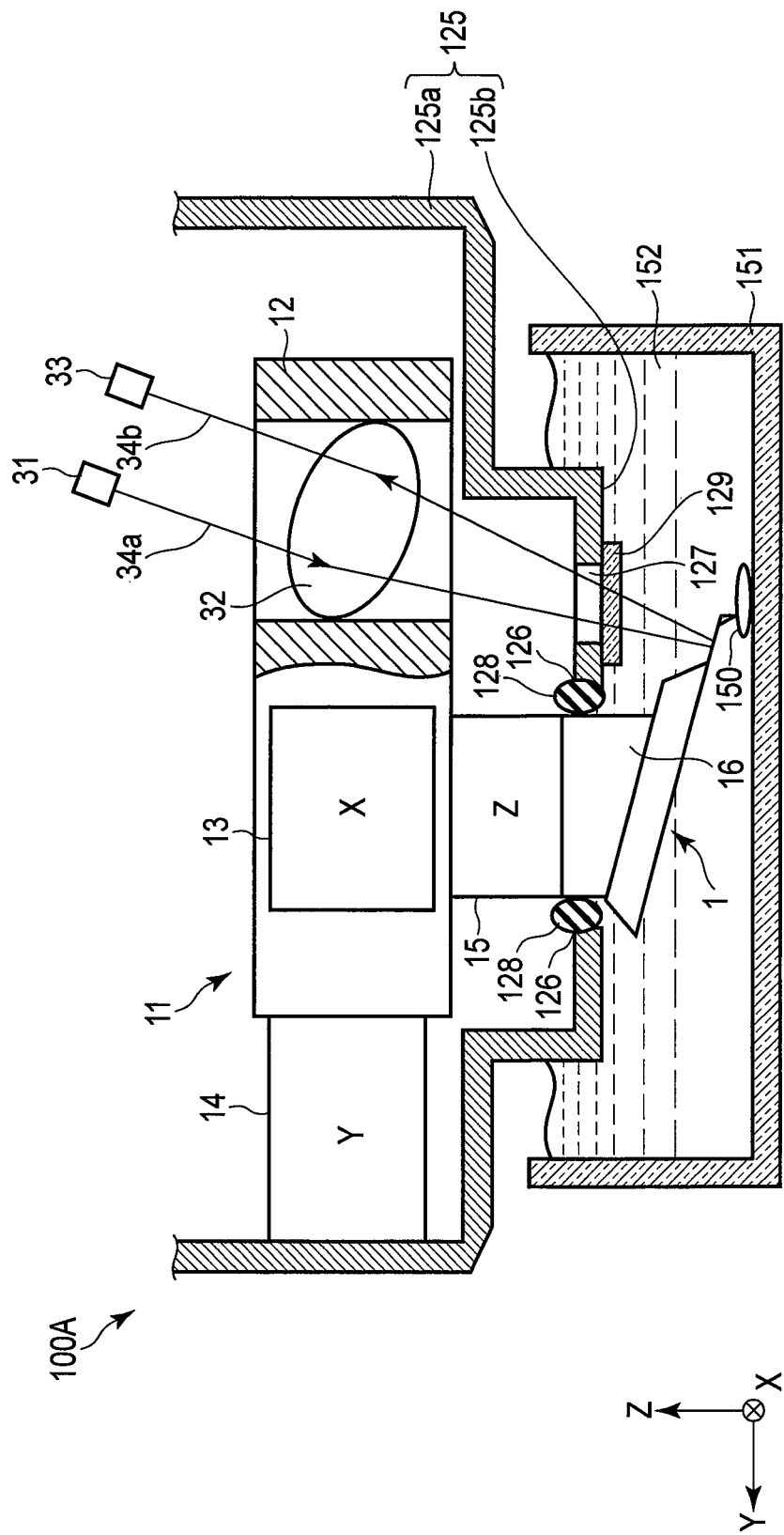
FIG. 15 is an enlarged view showing a probe microscope head shown in FIG. 14.

FIG. 14 shows a scanning probe microscope according to this embodiment. FIGS. 15, 16A, and 16B show a probe microscope head. In FIGS. 14, 15, 16A, and 16B, the same reference numerals as those in FIGS. 11, 12, 13A, and 13B denote the same parts, and a detailed description thereof will not be repeated.

As shown in FIG. 14, the scanning probe microscope according to this embodiment is different in the probe microscope head from the scanning probe microscope according to the first embodiment. As shown in FIG. 15, a probe microscope head 100A according to this embodiment is different from the probe microscope head 100 according to the first embodiment in a housing to contain a scanning mechanism 11. In the probe microscope head 100A, the housing to contain the scanning mechanism 11 is constituted by a basic housing 125 and an optical transmission plate 129. In other words, the probe microscope head 100A according to this embodiment is constituted by replacing the support member 121 and optical transmission plate 120 of the probe microscope head 100 according to the first embodiment with the basic housing 125 and the optical transmission plate 129.

The basic housing 125 is constituted by a peripheral wall portion 125a surrounding the scanning mechanism 11, and a bottom portion 125b closing the lower end of the peripheral wall portion 125a. The bottom portion 125b has a through hole 126, and a holder 16 extends through the through hole 126. The gap between the holder 16 and the through hole 126 is sealed in a waterproof fashion by an elastic member 128. Part of the holder 16 and a cantilever chip 1 project into a liquid cell 152 through the through hole 126. The elastic member 128 is made of a soft adhesive suitable for waterproofing, such as silicone rubber. Although part of the holder 16 projects into the liquid cell 52 in FIG. 15, the entire holder 16 may project into the liquid cell 152.

Further, the bottom portion 125b of the basic housing 125 has another through hole 127. The optical transmission plate 129 is an optically transparent plate made of glass or resin, and closes the through hole 127. The optical transmission plate 129 is adhered and fixed to the bottom portion 125b so as to maintain waterproofing. The through hole 127 and the optical transmission plate 129 constitute an optical transmission portion to transmit detection light 34a, 34b for detecting the displacement of the cantilever 3.

The bottom portion 125b and the optical transmission plate 129 constitute a liquid contact member including an optical transmission portion. The bottom portion 125b and the optical transmission plate 129 are arranged in contact with liquid on the sample mount 151, so as to cooperate with the sample mount 151 to sandwich the liquid, forming the liquid cell 152 for measuring a sample 150 in an in-liquid environment. That is, the bottom portion 125*b* and the optical transmission plate 129 include a cell forming portion to form the liquid cell 152 together with the sample mount 151. In this embodiment, the shape of the region of the liquid cell 152 is determined by the interface (contact surface) between the liquid and the liquid contact member (including part of the holder 16 and the cantilever chip 1) constituted by the bottom portion 125*b* and the optical transmission plate 129, the interface (contact surface) between the sample mount 151 and the liquid, and the interface between air and the liquid.

The holder 16 holds the cantilever chip 1 so that, for example, the longitudinal direction of the cantilever 3 is along the Y-axis, as shown in FIG. 16B.

The scanning probe microscope having the above arrangement according to this embodiment has the same advantages as those of the scanning probe microscope according to the first embodiment, and also has the following advantages.

The optical transmission plate 120 in the probe microscope head 100 according to the first embodiment is made of, e.g., glass or resin. The glass is fragile (chips easily). The resin readily causes aged deterioration. The influence of these factors becomes more serious as the size (area) of the optical transmission plate 120 becomes larger. To the contrary, in the probe microscope head 100A according to this embodiment, since the area of the optical transmission plate 129 is small, the above-mentioned influence can be reduced.

In this embodiment, the member to form the liquid cell together with the sample mount 151 is constituted by part of the basic housing 125, that is, the bottom portion 125*b*. However, the present invention is not limited to this, and this member may be constituted by a member not scanned by the scanning mechanism 11, e.g., a plate-like member fixed to the basic housing 125.

Although several embodiments of the present invention have been explained above with reference to the drawings, these embodiments are not intended to limit the scope of the invention. Various modifications and changes can be made without departing from the spirit of the invention. These modifications and changes include even the practice of a proper combination of the embodiments described above.

The embodiments have described an example in which the displacement sensor of the cantilever 3 is constituted by an optical lever type optical displacement sensor. Instead of using this optical displacement sensor, a self detection type cantilever in which a piezoresistive element is mounted on the cantilever 3 to detect the displacement of the cantilever 3 by itself may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning probe microscope to measure a sample set on a sample mount in a liquid, the microscope comprising:
   a scanning mechanism to scan a cantilever provided with a probe at a free end along an X-axis, a Y-axis, and a Z-axis perpendicular to each other; and
   a liquid contact member which includes an optical transmission portion to transmit detection light for detecting a displacement of the cantilever, and which is arranged at least partially in contact with the liquid,
   wherein the liquid contact member includes a cell forming portion which forms, in cooperation with the sample mount, a liquid cell having an interface between the liquid and air,
   wherein the scanning mechanism includes a holder to hold a cantilever chip including the cantilever, wherein the liquid contact member has a through hole, and wherein the cantilever chip and at least a part of the holder project into the liquid through the through hole,
   wherein a gap between the through hole and the holder is sealed in watertight by an elastic member, and
   wherein the elastic member is placed between the through hole and the holder so that a motion of the holder caused by the scanning mechanism is substantially absorbed by the elastic member.

2. The scanning probe microscope according to claim 1, further comprising a support member to support the scanning mechanism and the liquid contact member.

3. The scanning probe microscope according to claim 1, wherein the liquid cell has an interface between the liquid and the liquid contact member, an interface between the liquid and the sample mount, and the interface between the liquid and air.

4. The scanning probe microscope according to claim 1, wherein the optical transmission portion is constituted by a second through hole formed in the liquid contact member, and an optical transmission plate to close the second through hole.

5. The scanning probe microscope according to claim 1, further comprising a displacement sensor to detect a displacement of the cantilever, wherein the displacement sensor includes a light converging element to be scanned by the scanning mechanism together with the cantilever.

6. The scanning probe microscope according to claim 1, wherein the scanning mechanism includes an X-Y scanner to raster-scan the cantilever along the X-axis and the Y-axis, and
   wherein when the X-axis is set as a high-speed axis of the raster scanning and the Y-axis is set as a low-speed axis of the raster scanning, the cantilever is arranged so that a longitudinal direction thereof is along the Y-axis.

7. The scanning probe microscope according to claim 1, wherein the cell forming portion is arranged at a position opposite from the sample mount across the sample, so as to cooperate with the sample mount to sandwich the liquid, thereby forming the liquid cell.

8. The scanning probe microscope according to claim 1, wherein the optical transmission portion comprises at least a part of the cell forming portion.

9. The scanning probe microscope according to claim 1, wherein the scanning mechanism scans the cantilever with a part of the liquid being in contact with air.

10. A method of measuring a sample set on a sample mount in a liquid, the method comprising:
    arranging a cantilever provided with a probe at a free end in the liquid;
    arranging a liquid contact member including an optical transmission portion immovably, with at least a part of the liquid contact member being in contact with the liquid, so as to form a liquid cell having an interface between the liquid and air;
    scanning the cantilever in the liquid cell; and optically detecting movement of the cantilever during the scanning through the optical transmission portion, wherein the liquid contact member has a through hole, and wherein the cantilever is arranged in the liquid by:
  holding a cantilever chip including the cantilever with a holder,
  holding the holder through the through hole,
  projecting the cantilever chip and at least a part of the holder into the liquid, and
  watertightly sealing a gap between the through hole and the holder by an elastic member, wherein the elastic member is placed between the through hole and the holder so that a motion of the holder caused by scanning the cantilever in the liquid cell is substantially absorbed by the elastic member.

* * * * *